(12) United States Patent
Hara

(10) Patent No.: US 11,822,982 B2
(45) Date of Patent: Nov. 21, 2023

(54) API CONVERSION DEVICE, API CONVERSION METHOD, AND PROGRAM

(71) Applicant: Nippon Telegraph and Telephone Corporation, Tokyo (JP)

(72) Inventor: Daisuke Hara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 154 days.

(21) Appl. No.: 17/619,113

(22) PCT Filed: Jun. 21, 2019

(86) PCT No.: PCT/JP2019/024771
§ 371 (c)(1),
(2) Date: Dec. 14, 2021

(87) PCT Pub. No.: WO2020/255389
PCT Pub. Date: Dec. 24, 2020

(65) Prior Publication Data
US 2022/0276916 A1 Sep. 1, 2022

(51) Int. Cl.
*G06F 9/54* (2006.01)
*G06F 8/71* (2018.01)

(52) U.S. Cl.
CPC .............. *G06F 9/547* (2013.01); *G06F 8/71* (2013.01)

(58) Field of Classification Search
CPC ..................................................... G06F 9/541
See application file for complete search history.

(56) References Cited

U.S. PATENT DOCUMENTS

| 9,910,881 B1* | 3/2018 | Brooker ............. G06F 16/2329 |
| 2008/0034362 A1* | 2/2008 | Hayama ................. G06F 9/541 717/174 |
| 2008/0082974 A1* | 4/2008 | Ellison ..................... G06F 8/71 717/170 |

OTHER PUBLICATIONS

[No Author Listed] [online], "Cross-cloud API management platform," Google Cloud, available on or before Dec. 25, 2018, retrieved on Jun. 1, 2019, retrieved from URL <https://cloud.google.com/apigee/>, 19 pages (with English Translation).

(Continued)

*Primary Examiner* — Andy Ho
(74) *Attorney, Agent, or Firm* — Fish & Richardson P.C.

(57) ABSTRACT

In an API conversion device 100, an API conversion unit 140 receives an API conversion instruction from an API-version-number management unit 120, acquires API definitions 21 to 23 and an API conversion program 24 with an API conversion DB access unit 150, converts a received API into a new version number, when the API conversion program was not successfully acquired, extracts a difference between acquired API definitions of new and old version numbers, and, when a new parameter is present in an API definition of the new version number, requests a service provision system 10 to give insufficient information, generates an API conversion program 25 of the new version number based on the insufficient information acquired from the service provision system 10 and the API definitions 21 to 23 of the new and old version numbers acquired from an API conversion DB 20, and converts the received API into the new version number based on the API definitions 21 to 23 and the API conversion program 25.

4 Claims, 13 Drawing Sheets

(56) References Cited

OTHER PUBLICATIONS

[No Author Listed] [online] "Publishing, protecting and managing CA API Gateway backend applications, network systems and infrastructure via APIs," Broadcom Inc., available on or before Dec. 14, 2016, retrieved on Jun. 1, 2019, retrieved from URL <https://www.ca.com/jp/products/ca-api-gateway.html>, 35 pages (with English Translation).

* cited by examiner

Fig. 9

API DEFINITION - Identity API v2

```
swagger: "2.0"
info:
  version: "2.0"
  title: "Identity API"
paths:
  /v2.0/tokens:
    post:
      parameters:
      - name: "auth"
        in: "body"
        required: true
        type: object
      - name: "identity"
        in: "body"
        required: true
        type: object
      - name: "methods"
        in: "body"
        required: true
        type: array
      - name: "password"
        in: "body"
        required: true
        type: object
      - name: "user"
        in: "body"
        required: true
        type: object
      - name: "name"
        in: "body"
        required: false
        type: string
      responses:
        ⋮
```

API DEFINITION - Identity API v3

```
swagger: "2.0"
info:
  version: "2.0"
  title: "Identity API"
paths:
  /v3.0/tokens:
    post:
      parameters:
      - name: "auth"
        in: "body"
        required: true
        type: object
      - name: "identity"
        in: "body"
        required: true
        type: object
      - name: "methods"
        in: "body"
        required: true
        type: array
      - name: "password"
        in: "body"
        required: true
        type: object
      - name: "user"
        in: "body"
        required: true
        type: object
      - name: "name"
        in: "body"
        required: false
        type: string
      - name: "domain"
        in: "body"
        required: true
        type: string
      responses:
        ⋮
```

API CONVERSION DEVICE, API CONVERSION METHOD, AND PROGRAM

CROSS-REFERENCE TO RELATED APPLICATIONS

This application is a National Stage application under 35 U.S.C. § 371 of International Application No. PCT/JP2019/024771, having an International Filing Date of Jun. 21, 2019, the disclosure of which is considered part of the disclosure of this application, and is incorporated in its entirety into this application.

TECHNICAL FIELD

The present invention relates to an API conversion device, an API conversion method, and a program.

BACKGROUND ART

An API (Application Program Interface) for companies to manage services is provided on the Web. A server using the API constructs and operates services through software for invoking the API. Specifications of the API (a name, a URL (Uniform Resource Locator), parameters, and the like of the API) are prescribed by the companies. The server uses the API according to the prescription.

In a private cloud and an experiment environment, a new version is released every half year like OpenStack (registered trademark). When such server-based software is constructed for each policy, a plurality of version numbers tend to be mixed. It is likely that a version of the API is different for each of version numbers.

FIG. 12 is a schematic diagram of a network system in which a plurality of version numbers are mixed in a homogeneous API. FIG. 12 shows an access token acquisition API as an example. As shown in FIG. 12, the network system includes a service provision system 10 that provides an API service using a VNFM (VNF Manager) or an OSS (Operation Support System) and servers 31 to 33 that use the API service provided by the service provision system 10. The servers 31 to 33 execute functions related to authentication, policy management, and a catalog service using an OpenStack API and keystone, which is authentication means (Open Stack Identity) for the OpenStack API. It is assumed that the servers 31 to 33 have a plurality of version numbers of a homogenous API and the plurality of version numbers are an OpenStack Liberty version, an OpenStack Newton version, and an OpenStack Rocky version in order.

The service provision system 10 manages a private cloud and an experiment environment using the VNFM (VNF Manager) or the OSS (Operation Support System). A maintenance operator 10a has client libraries (an API v2 library 11, an API v3 library 12, and an API v4 library 13) for managing a difference of an API version.

As shown in FIG. 12, the service provision system 10 issues, using the API v2 library 11, Identity API v2 access token acquisition to the server 31 having the OpenStack Liberty version (see S1a). The server 31 transmits the access token (see S1a). Similarly, the service provision system 10 issues, using the API v3 library 12, Identity API v3 access token acquisition to the server 32 having the OpenStack Newton version (see S1b). The server 32 transmits the access token (see S2b). The service provision system 10 issues, using the API v4 library 13, Identity API v4 access token acquisition to the server 33 having the OpenStack Rocky version (see S1c). The server 33 transmits the access token (see S2c).

CITATION LIST

Non-Patent Literature

Non-Patent Literature 1: "Cross Cloud API Management Platform", 2018 Gartner Magic Quadrant, Connected Experience, [online], [searched on Jun. 1, 2019], Internet <URL: https://cloud.google.com/apigee/>
Non-Patent Literature 2: "CA API Gateway Backend Application, Network System, and Release, Protection, and Management via an API of an Infrastructure", [online], [searched on Jun. 1, 2019], Internet <URL: https://www.ca.com/jp/products/ca-api-gateway.html>

SUMMARY OF THE INVENTION

Technical Problem

As explained above, in the private cloud and the experiment environment, a new version is released approximately every half year like OpenStack. When server-based software is constructed for each policy, a plurality of version numbers tend to be mixed. It is likely that a version of an API is different for each of the version numbers.

When the environment is comprehensively managed using the VNFM or the OSS, the difference of the API version has to be absorbed using the client libraries (see the API v2 library 11, the API v3 library 12, and the API v4 library 13 shown in FIG. 12) or the like, leading to an increase in management cost.

Some API-GW (API Gateway) includes an API conversion function (see Non-Patent Literature 1 and Non-Patent Literature 2). In the API-GW, by implementing an API conversion program as the API conversion function, measures by the client libraries are unnecessary. However, development of the API conversion program is necessary. The management cost is not reduced.

The present invention has been made in view of such circumstances, and an object of the present invention is to provide an API conversion device, an API conversion method, and a program that can conceal a difference of a version number of an API of a management target system at low cost and reduce management cost of a service provision system.

Means for Solving the Problem

In order to solve the problems described above, the present invention is an API conversion device including: an access unit that accesses a storage unit that stores API definitions, which are definition documents describing APIs provided by a service provision system, and an API conversion program for an API conversion function; an API-version-number management unit that acquires, when a version number of an API of a management target system including a plurality of control target servers controllable using the APIs is not retained, the version number of the API from the management target system and instructs API conversion when a version number of the API of the service provision system and the version number of the API of the management target system are different; and an API conversion unit that receives the API conversion instruction from the API-version-number management unit, acquires the API definitions and the API conversion program with the access unit, converts a received API into a new version number, when the API conversion program was not successfully acquired, extracts a difference between the acquired API definitions of new and old version numbers, and, when a new parameter is present in the API definition of the new version number, requests the service provision system to give insufficient information and generates an API conversion program of the new version number based on the insufficient information acquired from the service provision system and the API definitions of the new and old version numbers acquired from the storage unit, and converts the received API into the new version number based on the API definitions and the API conversion program.

Effects of the Invention

According to the present invention, it is possible to provide an API conversion device, an API conversion method, and a program that can conceal a difference of a version number of an API of a management target system at low cost and reduce management cost of a service provision system.

BRIEF DESCRIPTION OF DRAWINGS

FIG. 9 is a diagram showing an example of extraction of a difference between new and old API definitions of the API conversion device according to the embodiment of the present invention.

DESCRIPTION OF EMBODIMENTS

An API conversion device and an API conversion method in a mode for carrying out the present invention (hereinafter referred to as "the present embodiment") are explained below with reference to the drawings.

Embodiment

Figure 1:
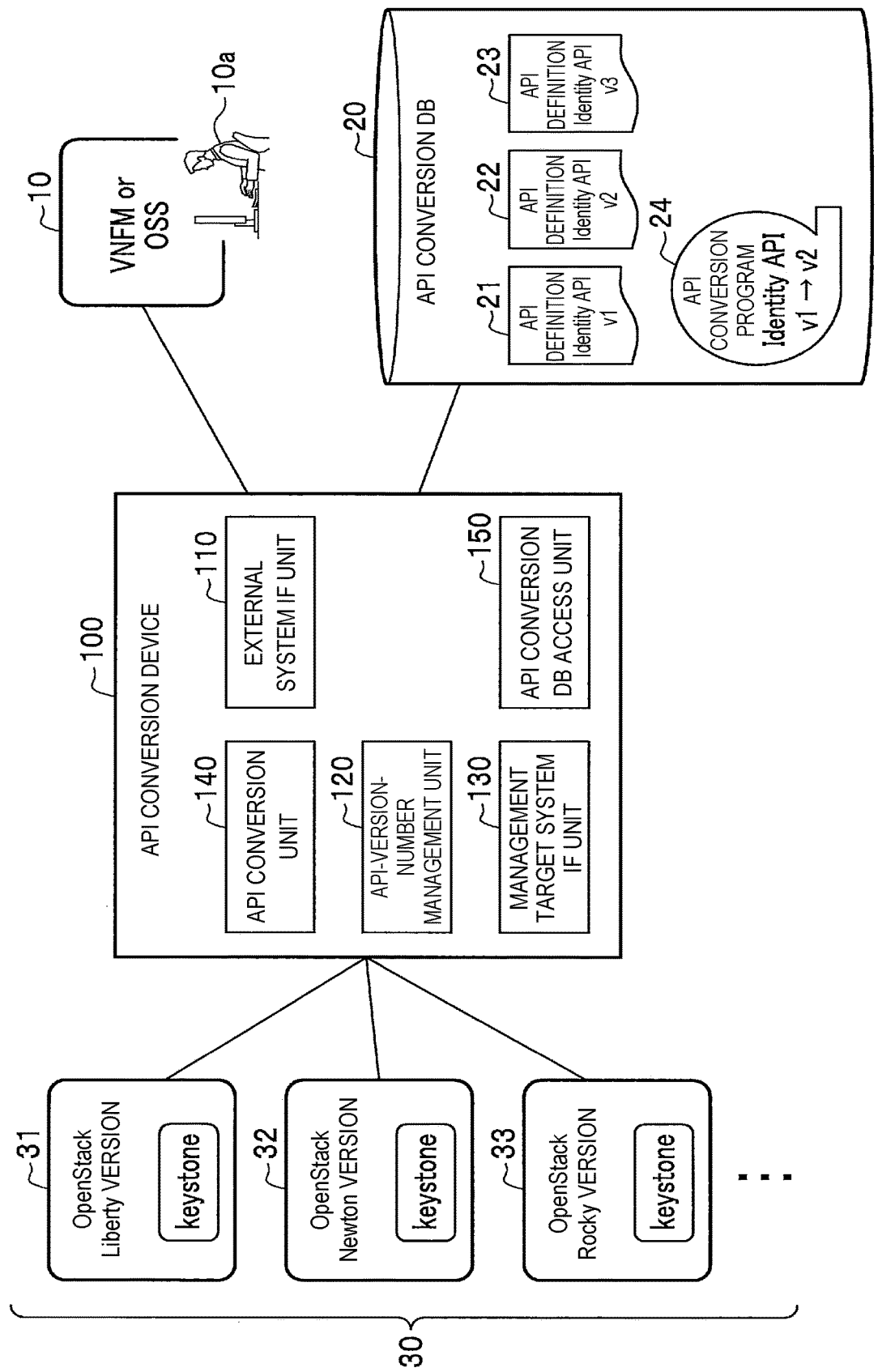
FIG. 1 is an overall configuration diagram of a network system to which an API conversion device according to an embodiment of the present invention is applied.

FIG. 1 is an overall configuration diagram of a network system to which an API conversion device 100 according to the embodiment of the present invention is applied.

As shown in FIG. 1, the network system includes a service provision system 10 that provides an API service using a VNFM or an OSS and a plurality of servers 31 to 33 (control target servers) controllable using APIs. The service provision system 10 is a management entity for APIs and is operated by a maintenance operator 10a.

The servers 31 to 33 execute functions related to authentication, policy management, and a catalog service using an OpenStack API and keystone, which is authentication means (OpenStack Identity) for the OpenStack API. It is assumed that the servers 31 to 33 have a plurality of version numbers of a homogenous API and the servers 31 to 33 are an OpenStack Liberty version server, an OpenStack Newton version server, and an OpenStack Rocky version server.

The API conversion device 100 is provided between the service provision system 10 and a management target system 30. As an example, the API conversion device 100 is set in an API-GW of the servers 31 to 33. In this case, the API conversion device 100 may be introduced as an API conversion function unit of the API-GW.

The API conversion device 100 performs API conversion corresponding to a version number of an API of the management target system 30 referring to an API conversion DB (database) 20 (a storage unit) (explained below). The API conversion DB 20 retains API definitions 21 to 23, which are definition documents describing APIs, and an API conversion program 24 for an API conversion function (explained below).

API Conversion Device 100

As shown in FIG. 1, the API conversion device 100 includes an external system IF (interface) unit 110, an API-version-number management unit 120, a management target system IF unit 130, an API conversion unit 140, and an API conversion DB access unit 150 (an access unit).

External System IF Unit

When receiving an API, the external system IF unit 110 notifies the reception of the API to the API-version-number management unit 120. The external system IF unit 110 notifies acquired insufficient information (a value of a relevant parameter) to the API conversion unit 140.

API-Version-Number Management Unit 120

The API-version-number management unit 120 manages a plurality of version numbers of a homogenous API. The API-version-number management unit 120 confirms whether the API-version-number management unit 120 retains a version number of the API of the management target system 30 and, when a version number of the API of the management target system 30 is not retained, acquires a version number of the API from the management target system 30, compares a version number (v2) of the API received from the service provision system 10 and the version number (v3) of the API of the management target system 30, and, when the version numbers of the APIs are different, instructs the API conversion unit 140 to perform API conversion. Specifically, the API-version-number management unit 120 performs API version number management of (1) to (3) described below.

(1) The API-version-number management unit 120 confirms whether the API-version-number management unit 120 retains a version number of the API of the API management target system 30. When a version number of the API is not retained, the API-version-number management unit 120 instructs the management target system IF unit 130 to acquire a version number of the API. The API-version-number management unit 120 instructs the management target system IF unit 130 to transmit an access token acquisition API (v3).

(2) The API-version-number management unit 120 compares the received API version number (v2) and the version number (v3) of the API of the target system and, when the version numbers of the APIs are different, instructs the API conversion unit 140 to perform API conversion.

The API-version-number management unit 120 confirms whether the API-version-number management unit 120 retains a version number of the API of the API management target system 30. When a version number of the API is retained, the API-version-number management unit 120 compares the version number (v2) of the received API and the version number (v3) of the API of the management target system 30 and, when the version numbers of both the APIs are different, instructs the API conversion unit 140 to perform API conversion.

(3) The API-version-number management unit 120 instructs, via the external system IF unit 110, return of an access token responding to access token acquisition from the service provision system 10.

Management Target System IF Unit 130

The management target system IF unit 130 answers the version number (v3) of the API to the API-version-number management unit 120. The management target system IF unit 130 notifies the acquired access token to the API-version-number management unit 120.

API Conversion Unit 140

After executing instruction operations to the units, the API conversion unit 140 performs API conversion using a predetermined API conversion program and, when the predetermined API conversion program is absent, generates the API conversion program. The API conversion unit 140 are explained about the following items (4) to (6).

(4) Instruction Operations to the Units

The API conversion unit 140 instructs the API conversion DB access unit 150 to acquire an API conversion program (v2→v3).

The API conversion unit 140 instructs the API conversion DB access unit 150 to acquire API definitions (Identity APIs v2 and v3). The API conversion unit 140 extracts a difference (diff) between the API definition (v2) and the API definition (v3).

When a new parameter is present in a new version number (v3), the API conversion unit 140 instructs the external system IF unit 110 to request insufficient information.

The API conversion unit 140 generates an API conversion program (v2→v3) using the API definition (v2), the API definition (v3), and the insufficient information. The API conversion unit 140 instructs the API conversion DB access unit 150 to register the API conversion program (v2→v3) in the API conversion DB 20. The API conversion unit 140 instructs the API conversion DB access unit 150 to acquire the API conversion program (v2→v3).

The API conversion unit 140 converts the received access token acquisition API from v2 into v3 using an API conversion program (v2→v3) 25. The API conversion unit 140 notifies the API conversion result to the API-version-number management unit 120.

(5) When a predetermined API conversion program can be acquired

The API conversion unit 140 receives the API conversion instruction, acquires the API definitions (Identity APIs v2 and v3) and the API conversion program (Identity API v2→v3) from the API conversion DB 20, and converts the received API from v2 into v3 based on the acquired API definitions (Identity APIs v2 and v3) and the API conversion program (Identity API v2→v3) 25.

(6) When the predetermined API conversion program is absent and the API conversion program is generated When the API conversion program (Identity API v2→v3) 25 was not successfully acquired, the API conversion unit 140 extracts a difference (diff) between the API definition (Identity API v2) and the API definition (Identity API v3) and, when a new parameter is present in the new version number (v3), requests the service provision system 10 to give insufficient information, and generates the API conversion program (Identity API v2→v3) based on the insufficient information acquired from the service provision system 10 and the API definition (Identity API v2) 22 and the API definition (Identity API v3) 23 acquired from the API conversion DB 20.

API Conversion DB Access Unit 150

The API conversion DB access unit 150 accesses the API conversion DB 20 that stores the API definitions (Identity APIs v1) 21 to 24 and the API conversion program (Identity API) 24.

The API conversion DB access unit 150 notifies a relevant API definition and an acquisition result of a predetermined API conversion program to the API conversion unit 140. When an API conversion program was not successfully acquired, the API conversion DB access unit 150 notifies "absent" to the API conversion unit 140.

API Conversion DB 20

As shown in FIG. 1, the API conversion DB 20 stores the API definition (Identity API v1) 21, the API definition (Identity API v2) 22, and the API definition (Identity API v3) 23, which are definition documents describing APIs, and the API conversion program (Identity API) 24 for the API conversion function.

The operation of the API conversion device 100 configured as explained above is explained below.

Operation Overview

First, an operation overview of the API conversion device 100 is explained with reference to FIG. 2 to FIG. 3.

Preparation

Figure 2:
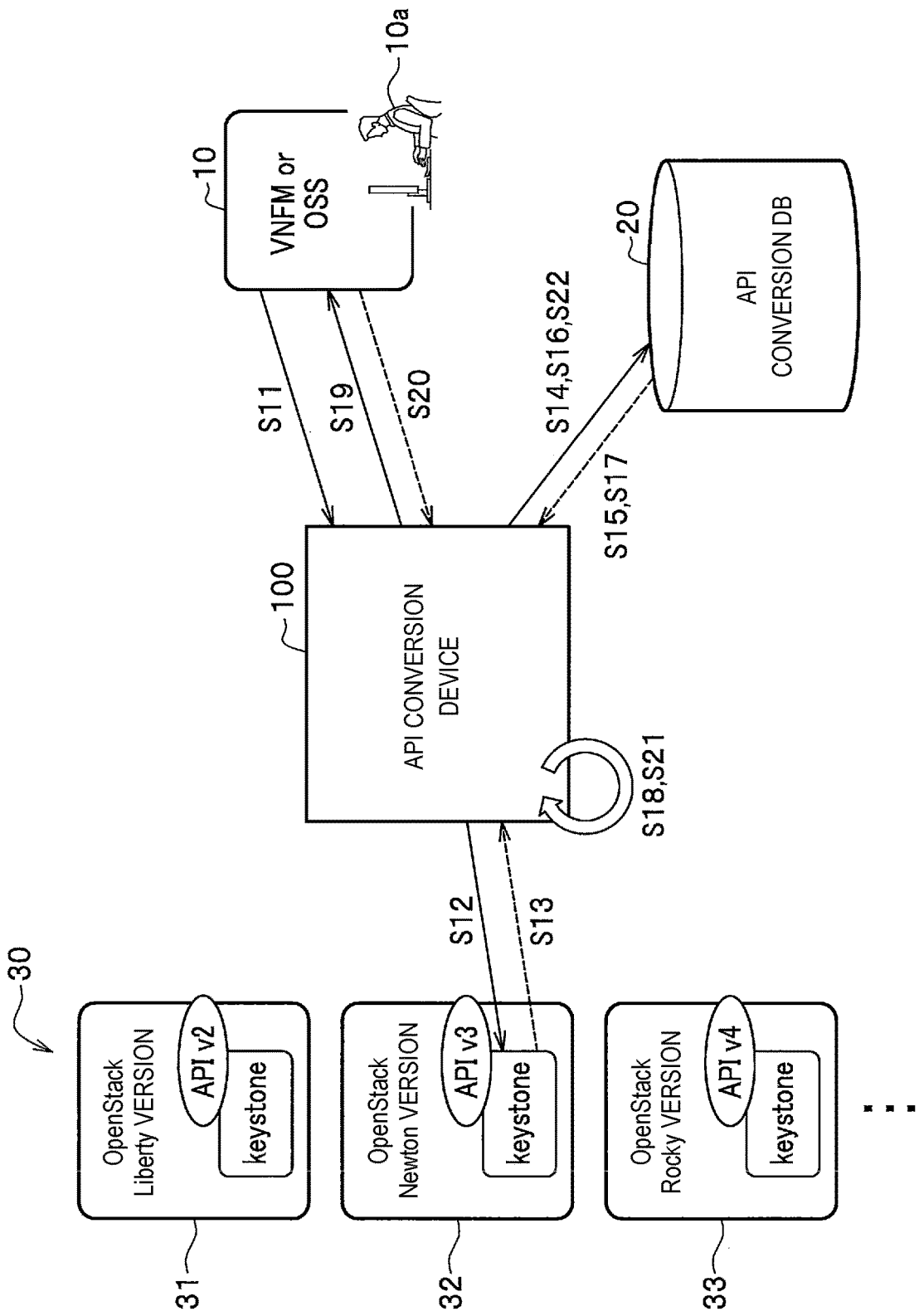
FIG. 2 is a diagram showing an operation example of preparation of the API conversion device according to the embodiment of the present invention.

FIG. 2 is a diagram showing an operation example of preparation of the API conversion device 100. FIG. 2 shows an API execution test performed prior to a real operation shown in FIG. 3 explained below. An "access token acquisition API" is explained as an operation example.

As shown in FIG. 2, the management target system 30 is the servers 31 to 33 having different version numbers of the access token acquisition API. For example, the OpenStack Liberty version server 31 is a server, the access token acquisition API of which is Identity API v2. The OpenStack Newton version server 32 is a server, the access token acquisition API of which is Identity API v3. The OpenStack Rocky version server 33 is a server, the access token acquisition API of which is Identity API v4.

The maintenance operator 10a of the service provision system 10 issues access token acquisition for the Identity API v2 to the management target system 30 (step S11). The API conversion device 100 receives the access token acquisition for the Identity API v2, converts the access token acquisition API (v2) into an API version number acquisition API (API conversion (Identity API v2→the API version number conversion API)), and transmits API version number acquisition to the management target system 30 (the OpenStack Newton version server 32) (step S12). Note that, since an API version number of the OpenStack Newton version server 32 is unknown yet, the API conversion is not API conversion (conversion between different version numbers of a homogeneous API) explained below but is conversion from the access token acquisition API (v2) to the API version number acquisition API.

The OpenStack Newton version server 32 transmits the API version number (v3) to the API conversion device 100 (step S13).

The API conversion device 100 attempts to acquire the API conversion program (v2→v3) 25 from the API conversion DB 20 (see FIG. 6 and FIG. 7 referred to below: the same applies below) (step S14). In the example shown in FIG. 2, the API conversion DB 20 shown in FIG. 1 has the API conversion program (Identity API v1→v2) 24 but does not have the API conversion program (Identity API v2→v3) 25. Accordingly, the API conversion DB 20 returns the API conversion program (Identity API v2→v3) 25 "absent" to the API conversion device 100 (step S15).

The API conversion device 100 receives the API conversion program (Identity API v2→v3) 25 "absent" from the API conversion DB 20 and performs the following operation in order to generate the API conversion program (Identity API v2→v3) 25.

The API conversion device 100 issues a request for acquiring the API definition (Identity API v2) 22 and the API definition (Identity API v3) 23 (see FIG. 1) from the API conversion DB 20 (step S16). The API conversion DB 20 returns the API definition (Identity API v2) 22 and the API definition (Identity API v3) 23 to the API conversion device 100 (step S17).

The API conversion device 100 extracts, based on the API definition (Identity API v2) 22 and the API definition (Identity API v3) 23, a difference (diff v2⇔v3) between the API definition (Identity API v2) 22 and the API definition (Identity API v3) 23 (step S18).

The API conversion device 100 requests the maintenance operator 10a to give insufficient information becoming insufficient when the API conversion program (Identity API v2→v3) is generated (step S19). In this case, by notifying an attribute indicating whether an insufficient parameter is essential or optional to the maintenance operator 10a, it is possible to achieve a reduction in work when the maintenance operator 10 a examines the insufficient information. The maintenance operator 10a answers the insufficient information to the API conversion device 100 (step S20). A form may be adopted in which a GUI (Graphical User Interface) screen is displayed to the maintenance operator 10a and the maintenance operator 10a performs a GUI screen input.

The API conversion device 100 generates the API conversion program (Identity API v2→v3) 25 based on the insufficient information becoming insufficient when the acquired API conversion program (Identity API v2→v3) 25 is generated and the API definition (Identity API v2) 22 and the API definition (Identity API v3) 23 (step S21).

Figure 6:
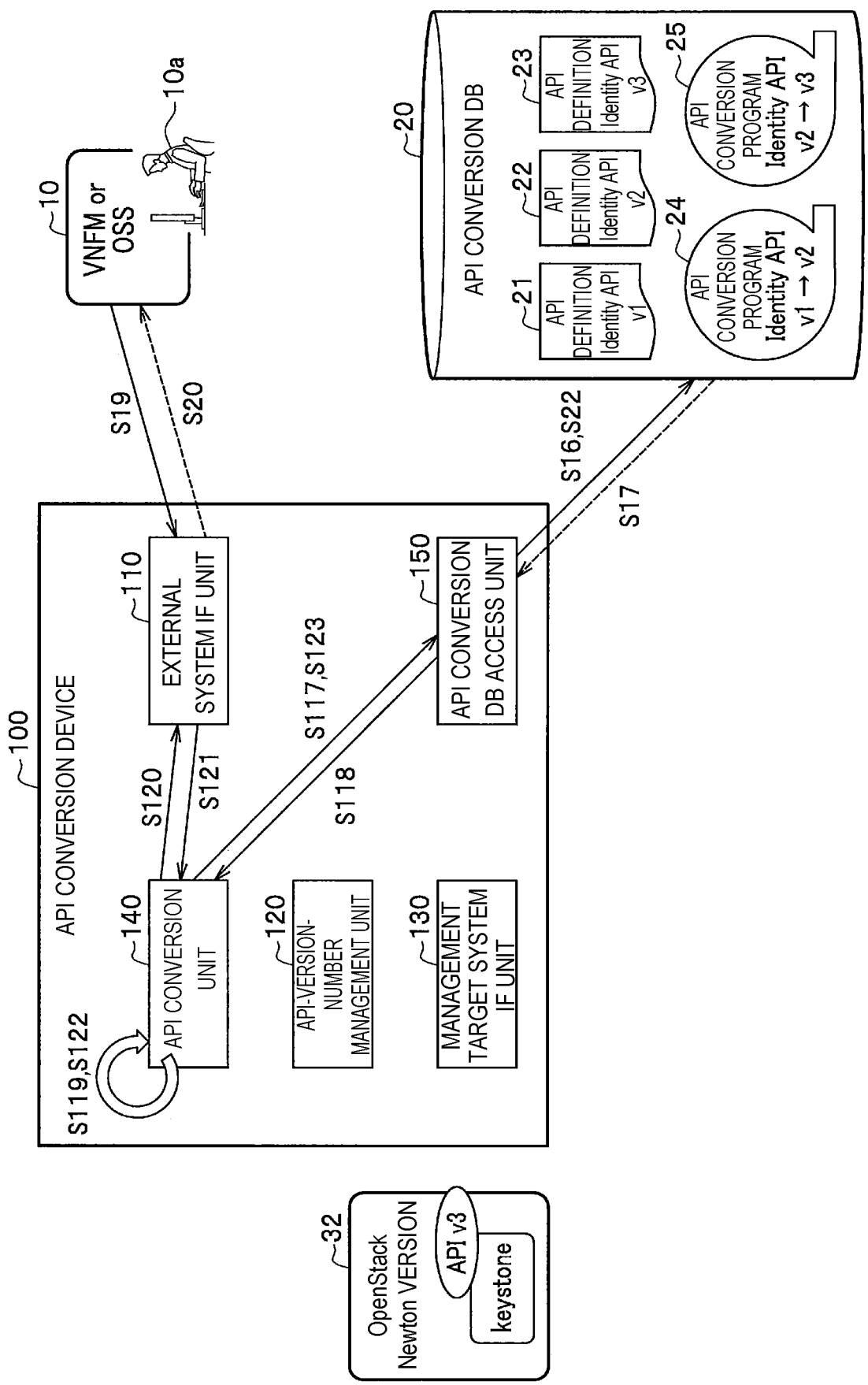
FIG. 6 is a diagram showing the detailed operation example of the preparation of the API conversion device according to the embodiment of the present invention.
Figure 7:
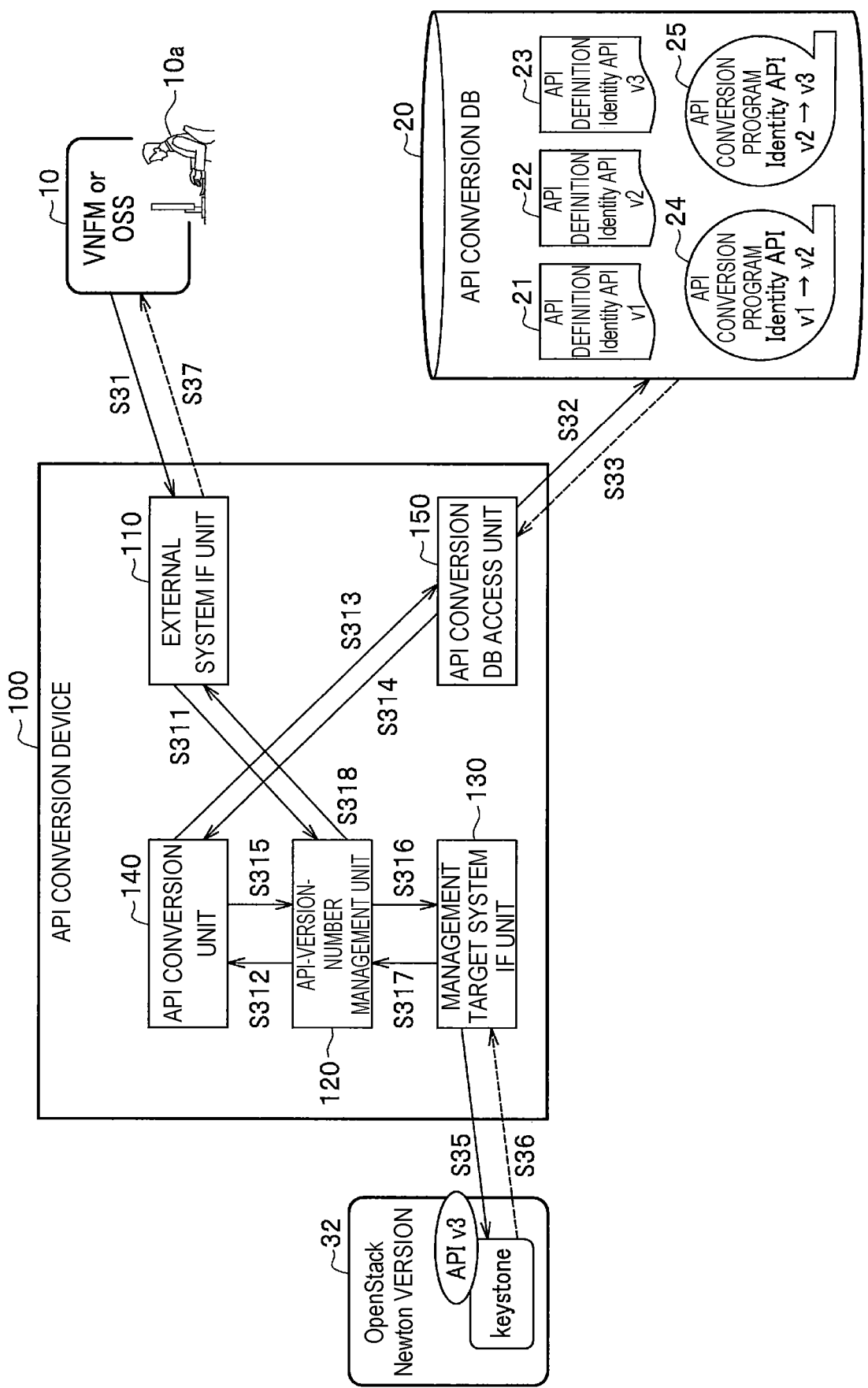
FIG. 7 is a diagram showing a detailed real operation example of the API conversion device according to the embodiment of the present invention.

The API conversion device 100 registers the generated API conversion program (Identity API v2→v3) 25 in the API conversion DB 20 (step S22). Note that, as shown in FIG. 6 and FIG. 7 referred to below, the API conversion program (Identity API v2→v3) 25 generated by the API conversion device 100 is registered in the API conversion DB 20. In this way, other users can reuse the API conversion program once registered in the API conversion DB 20 by referring to the API conversion program.

Real Operation Example

Figure 3:
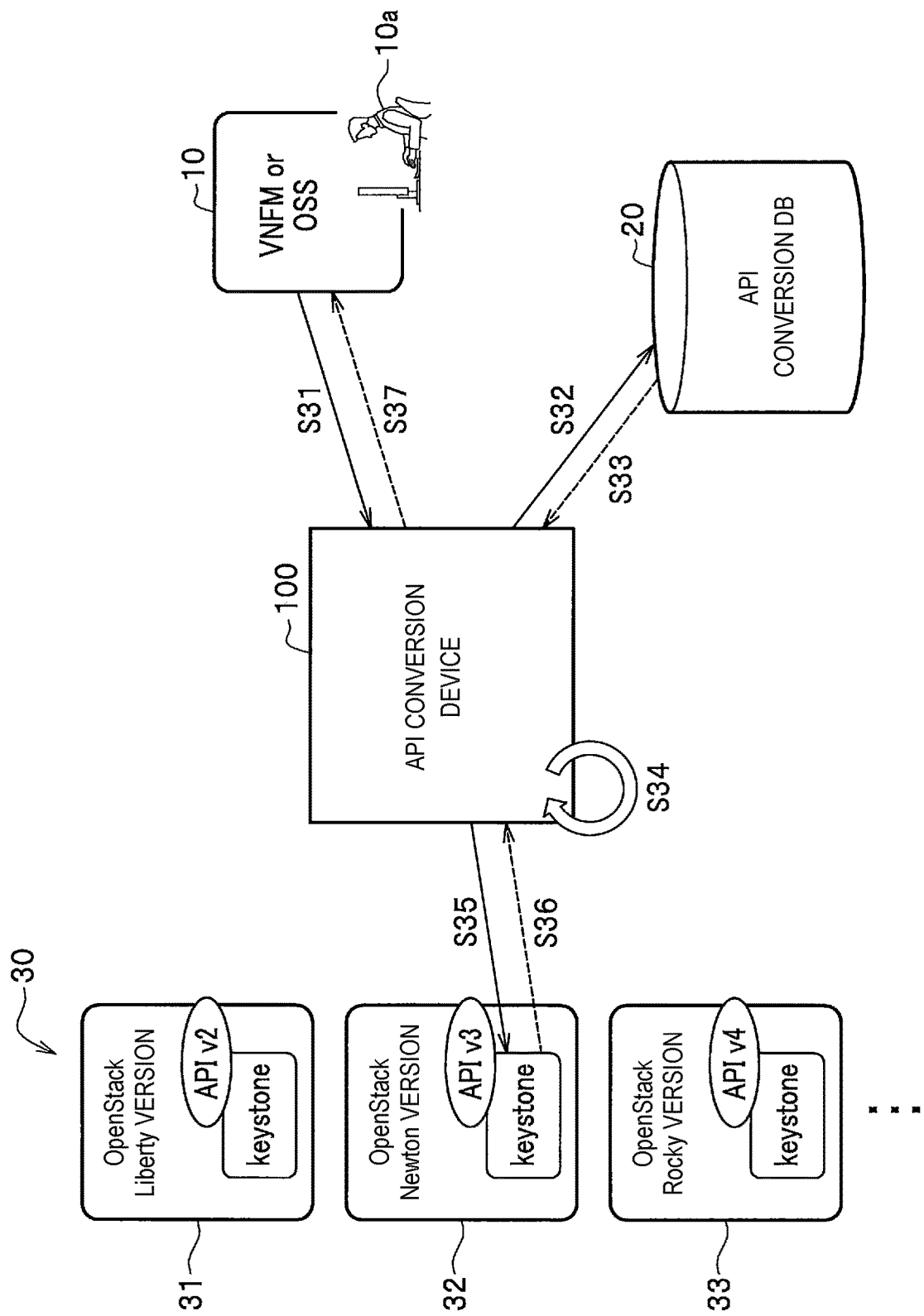
FIG. 3 is a diagram showing a real operation example of the API conversion device according to the embodiment of the present invention.

FIG. 3 is a diagram showing a real operation example of the API conversion device 100. By the execution of the preparation of the API conversion device 100 shown in FIG. 2 referred to above, the API conversion program (Identity API v2→v3) 25 is registered in the API conversion DB 20.

As shown in FIG. 3, the maintenance operator 10a of the service provision system 10 issues access token acquisition for the Identity API v2 to the management target system 30 (step S31). The API conversion device 100 receives the issuance of the access token acquisition for the Identity API v2 and requests the API conversion DB 20 to acquire the API conversion program (Identity API v2→v3) (step S32). The API conversion DB 20 transmits the API conversion program (Identity API v2→v3) to the API conversion device 100 (step S33).

The API conversion device 100 acquires the API conversion program (Identity API v2→v3) 25 from the API conversion DB 20 and performs the API conversion (Identity API v2→v3) for converting the version number of the Identity API from v2 into v3 (step S34).

The API conversion device 100 performs, based on the Identity API v3 obtained by converting the Identity API v2 into the Identity API v3 by the API conversion, access token acquisition for the Identity API v3 from the management target system 30 (the OpenStack Newton version server 32) (step S35). The OpenStack Newton version server 32 transmits an access token for the Identity API v3 to the API conversion device 100 (step S36).

The API conversion device 100 transmits the access token for the Identity API v3 acquired from the OpenStack Newton version server 32 to the maintenance operator 10a (step S37).

API Conversion Rule Generation Procedure

Figure 4:
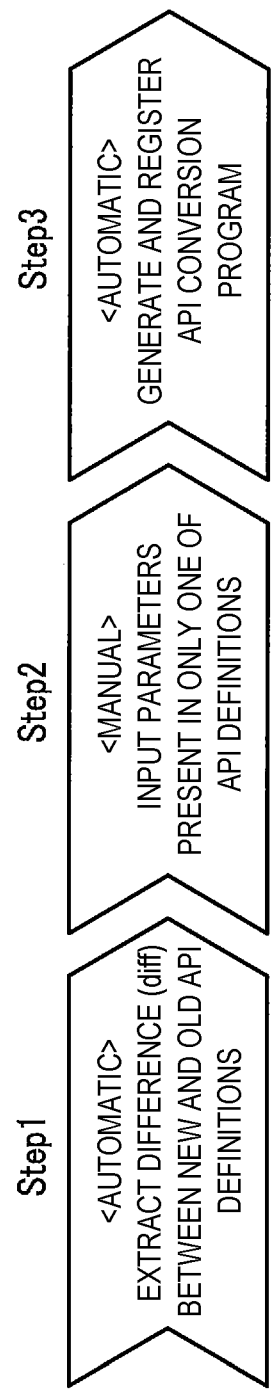
FIG. 4 is a diagram showing an API conversion rule generation procedure of the API conversion device according to the embodiment of the present invention.

FIG. 4 is a diagram showing an API conversion rule generation procedure of the API conversion device 100.

Addition and deletion of parameters occur according to upgrading of an API. However, the addition and the deletion of parameters are not always executed in real time. Accordingly, it is difficult to completely automate the addition and the deletion of parameters. In the present embodiment, a processing operation is optimized by combining necessary minimum manual processing (see Step 2 in FIG. 4) and automatic processing (see Step 1 and Step 3 in FIG. 4).

In the automatic processing in Step 1, extraction of a difference (diff) between new and old API definitions is performed. Specifically, the automatic processing in Step 1 is processing for extracting the difference (diff v2⇔v3) between the API definition (Identity API v2) 22 and the API definition (Identity API v3) 23 in S18 in FIG. 2.

In the manual processing in Step 2, parameters present in only one of the API definitions are input. Specifically, the manual processing in Step 2 is the request for the insufficient information becoming insufficient when the API conversion program is generated in S19 in FIG. 2 and the answer of the insufficient information in S20 in FIG. 2.

The automatic processing in Step 3 is generation and registration of an API conversion program. Specifically, the automatic processing in Step 3 is the generation of the API conversion program in S21 in FIG. 2 and the registration of the API conversion program generated in the API conversion DB 20 in S22 in FIG. 2.

Operation Details

Subsequently, operation details of the API conversion device 100 are explained with reference to FIG. 5 to FIG. 8.

Preparation

Figure 5:
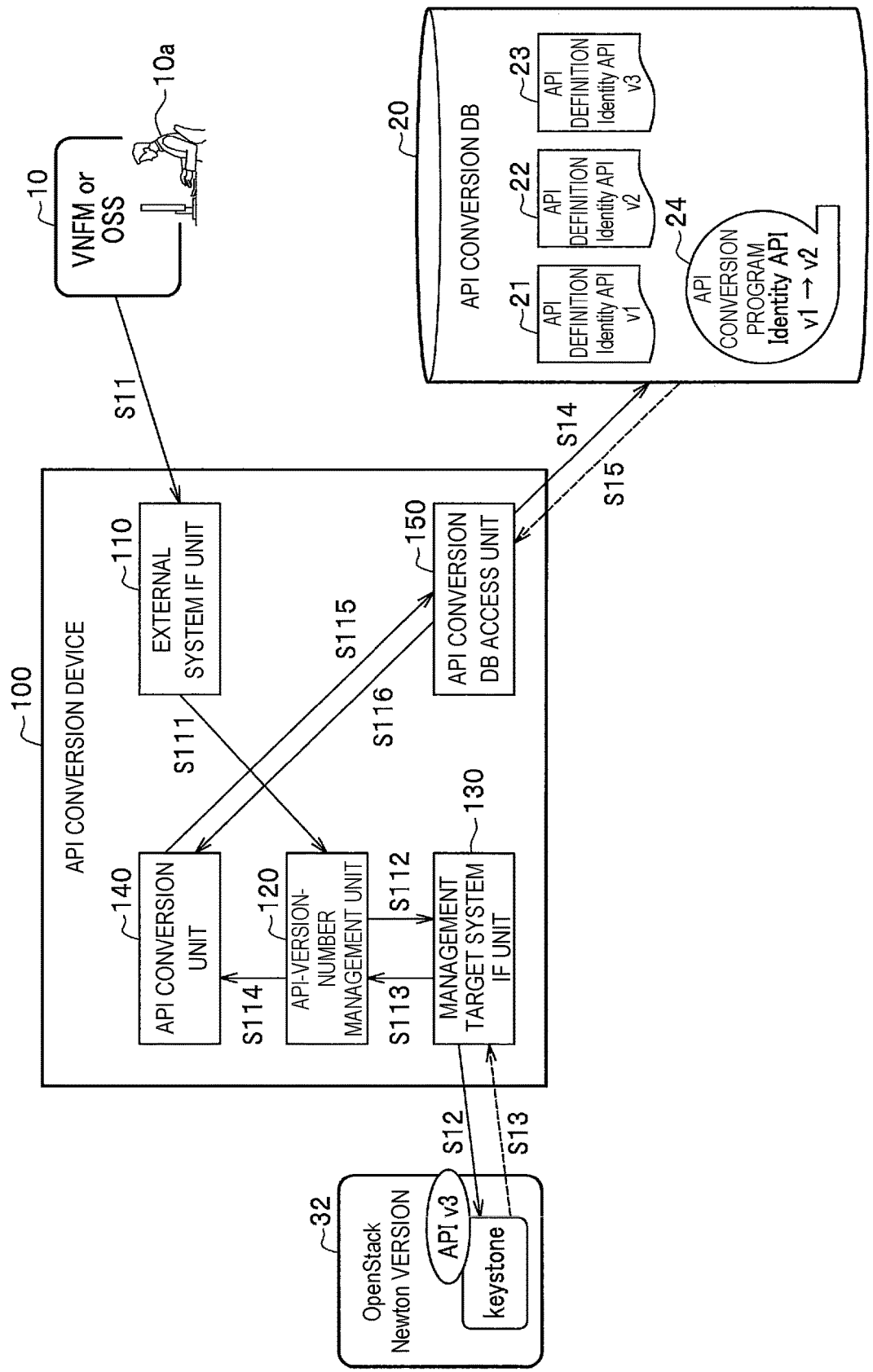
FIG. 5 is a diagram showing a detailed operation example of the preparation of the API conversion device according to the embodiment of the present invention.

FIG. 5 and FIG. 6 are diagrams showing a detailed operation example of preparation of the API conversion device 100 and show details of the operation of the preparation of the API conversion device 100 shown in FIG. 2. In FIG. 5, as in FIG. 2, the "access token acquisition API" is explained as an operation example. Steps for executing the same processing as the processing shown in FIG. 2 are denoted by the same reference signs.

As shown in FIG. 5, the maintenance operator 10a of the service provision system 10 issues access token acquisition for the Identity API v2 to the management target system 30 (step S11). The API conversion device 100 receives the access token acquisition for the Identity API v2, converts the access token acquisition API (v2) into the API version number acquisition API (the API conversion (Identity API v2→API version number conversion API)), and transmits API version number acquisition to the management target system 30 (the OpenStack Newton version server 32) (step S12).

An API conversion function of the API conversion device 100 is as explained below.

When receiving an API (the access token acquisition for the Identity API v2) from the maintenance operator 10a of the service provision system 10 (step S11), the external system IF unit 110 notifies the reception of the API to the API-version-number management unit 120.

The API-version-number management unit 120 confirms whether the API-version-number management unit 120 retains a version number of an API of destination system of an API (the access token acquisition for the Identity API v2) (step S111). When a version number of the API of the destination system of the API (the access token acquisition for the Identity API v2) is not retained, the API-version-number management unit 120 instructs the management target system IF unit 130 to acquire a version number of the API (step S112). Since the API-version-number management unit 120 does not retain a version number of the API of the destination system of the API (the access token acquisition for the Identity API v2) now, the API-version-number management unit 120 instructs the management target system IF unit 130 to acquire a version number of the API.

The management target system IF unit 130 answers an API version number (Identity API v3) to the API-version-number management unit 120 (step S113). The API-version-number management unit 120 compares the API version number (Identity API v2) received by the external system IF unit 110 and the API version number (Identity API v3) of the management target system 30 (the OpenStack Newton version server 32). When the API version numbers are different, the API-version-number management unit 120 instructs the API conversion unit 140 to perform API conversion (step S114).

The API conversion unit 140 instructs the API conversion DB access unit 150 to acquire the API conversion program (Identity API v2→v3) (step S115). The API conversion DB access unit 150 attempts to acquire the API conversion program (Identity API v2→v3) from the API conversion DB 20 (step S14). In the example shown in FIG. 5, the API conversion DB 20 does not have the API conversion program (Identity API v2→v3). Accordingly, the API conversion DB 20 returns the API conversion program (Identity API v2→v3) 25 "absent" to the API conversion device 100 (step S15).

The API conversion DB access unit 150 notifies a result from the API conversion DB 20 (in this case, since the API conversion DB access unit 150 has not successfully acquired the API conversion program (Identity API v2→v3), "absent") to the API conversion unit 140 (step S116).

In the operation performed to this point, since the API conversion device 100 has confirmed that the API conversion program (Identity API v2→v3) 25 is absent in the API conversion DB 20, the API conversion device 100 performs generation of the API conversion program (Identity API v2→v3) 25 explained below.

As shown in FIG. 6, the API conversion unit 140 instructs the API conversion DB access unit 150 to acquire the API definitions (Identity APIs v2 and v3) (step S117). The API conversion DB access unit 150 notifies the relevant API definitions to the API conversion unit 140 (step S118).

The API conversion unit 140 extracts the difference (diff v2⇔v3) between the API definition (Identity API v2) 22 and the API definition (Identity API v3) 23 (step S119).

The API conversion unit 140 determines whether a new parameter is present in the new version (v3) (step S120) and, when a new parameter is present in the new version (v3), instructs the external system IF unit 110 to request insufficient information (step S120).

The external system IF unit 110 notifies insufficient information (a value of the relevant parameter) acquired from the maintenance operator 10a (steps S19 and S20) to the API conversion unit 140 (step S121).

The API conversion unit 140 generates the API conversion program (Identity API v2→v3) based on the acquired insufficient information becoming insufficient when the API conversion program (Identity API v2→v3) is generated and the API definition (Identity API v2) 22 and the API definition (Identity API v3) 23 (step S122).

The API conversion unit 140 instructs the API conversion DB access unit 150 to register the API conversion program (Identity v2→v3) in the API conversion DB 20 (step S123).

The API conversion DB access unit 150 registers the generated API conversion program (Identity API v2→v3) in the API conversion DB 20 (step S22). Consequently, the API conversion program (Identity API v2→v3) 25 generated by the API conversion device 100 is registered in the API conversion DB 20.

Real operation example

FIG. 7 is a diagram showing a detailed real operation example of the API conversion device 100 and shows details of the real operation of the API conversion device 100 shown in FIG. 3. Steps for executing the same processing as the processing shown in FIG. 3 are denoted by the same reference signs.

According to the execution of the preparation of the API conversion device 100 shown in FIG. 5 and FIG. 6 referred to above, the API conversion program (Identity API v2→v3) 25 is registered in the API conversion DB 20.

As shown in FIG. 7, the maintenance operator 10a of the service provision system 10 issues access token acquisition for the Identity API v2 to the management target system 30 (step S31).

When receiving an API, the external system IF unit 110 notifies the reception of the API to the API-version-number management unit 120 (step S311).

The API-version-number management unit 120 confirms whether the API-version-number management unit 120 retains a version number of an API of the management target system 30 (the OpenStack Newton version server 32), which is a destination system of the API. When the API-version-number management unit 120 retains a version number of the API, the API-version-number management unit 120 compares the version number (v2) of the API received from the maintenance operator 10a and the version number (v3) of the API of the management target system 30 (the OpenStack Newton version server 32) and, when the version numbers of the APIs are different, instructs the API conversion unit 140 to perform API conversion (step S312).

The API conversion unit 140 instructs the API conversion DB access unit 150 to acquire the API conversion program (Identity API v2→v3) (step S313).

The API conversion DB access unit 150 notifies a result to the API conversion unit 140 (step S314). In this case, since the API conversion DB access unit 150 has succeeded in acquiring the API conversion program (Identity API v2→v3), the API conversion DB access unit 150 transmits the "API conversion program (Identity API v2→v3)" to the API conversion unit 140.

The API conversion unit 140 converts, using the acquired API conversion program (Identity API v2→v3), the access token acquisition API received by the external system IF unit 110 from v2 into v3.

The API conversion unit 140 notifies an API conversion result to the API-version-number management unit 120 (step S315).

The API-version-number management unit 120 instructs the management target system IF unit 130 to transmit the access token acquisition API (v3) (step S316). The management target system IF unit 130 notifies the acquired access token to the API-version-number management unit 120 (step S17).

The API-version-number management unit 120 instructs the external system IF unit 110 to return the access token (step S318). The external system IF unit 110 transmits the access token for the Identity API v3 received from the OpenStack Newton version server 32 to the maintenance operator 10a (step S37).

Operation Flow

Figure 8A:
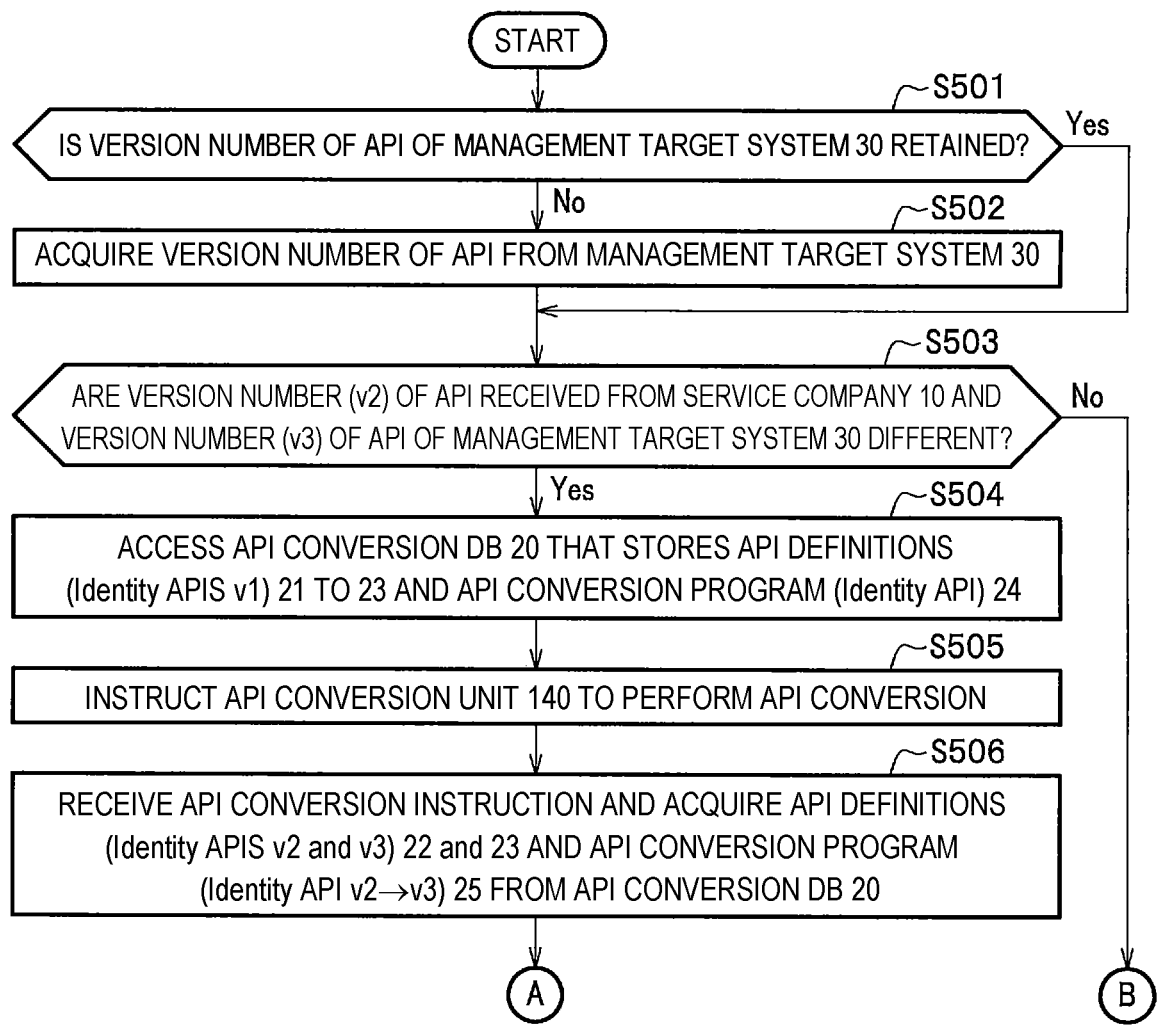
FIG. 8A is a flowchart showing a main operation of an API conversion method of the API conversion device according to the embodiment of the present invention.
Figure 8B:
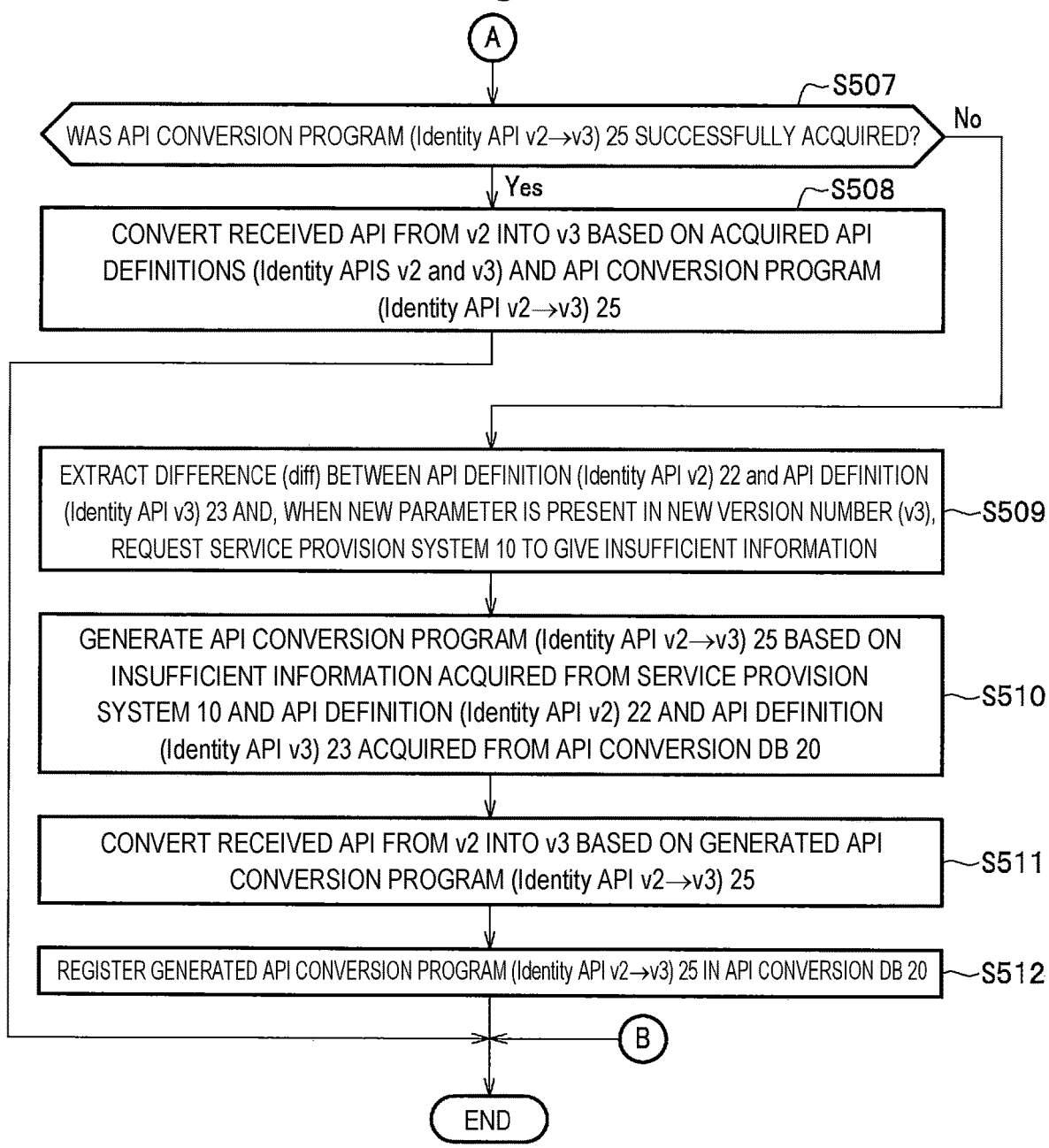
FIG. 8B is a flowchart showing the main operation of the API conversion method of the API conversion device according to the embodiment of the present invention.

FIG. 8A and FIG. 8B are flowcharts showing a main operation of an API conversion method of the API conversion device 100.

In step S501, the API-version-number management unit 120 (see FIG. 1) confirms whether the API-version-number management unit 120 retains a version number of an API of the management target system 30 (see FIG. 1). When the API-version-number management unit 120 does not retain a version number of the API of the management target system 30 (step S501: No), in step S502, the API-version-number management unit 120 acquires a version number of the API from the management target system 30. When the API-version-number management unit 120 does retain a version number of the API of the management target system 30 (step S501: Yes), the API-version-number management unit 120 proceeds to step S503.

In step S503, the API-version-number management unit 120 determines whether the version number (v2) of the API received from the service provision system 10 and the version number (v3) of the API of the management target system 30 are different.

When the version numbers of the APIs are different (step S503: Yes), the API-version-number management unit 120 proceeds to step S504 and, when the version numbers of the APIs are not different (when the version numbers are the same) (step S503: No), the API-version-number management unit 120 ends the processing of this flow.

In step S504, the API conversion DB access unit 150 accesses the API conversion DB 20 that stores the API definitions (Identity APIs v1) 21 to 23 and the API conversion program (Identity API) 24.

In step S505, the API conversion DB access unit 150 instructs the API conversion unit 140 to perform API conversion.

In step S506, the API conversion unit 140 receives the API conversion instruction and acquires the API definitions (Identity APIs v2 and v3) 22 and 23 and the API conversion program (Identity API v2→v3) 25 from the API conversion DB 20.

In step S507, the API conversion unit 140 determines whether the API conversion unit 140 has succeeded in acquiring the API conversion program (Identity API v2→v3) 25.

When the API conversion program (Identity API v2→v3) 25 was successfully acquired (step S507: Yes), in step S508, the API conversion unit 140 converts the received API from v2 into v3 based on the acquired API definitions (Identity APIs v2 and v3) and the API conversion program (Identity API v2→v3) 25 and ends this flow.

On the other hand, when the API conversion program (Identity API v2→v3) 25 was not successfully acquired in step S507 (step S507: No), the API conversion unit 140 executes processing in step S509 and subsequent steps explained below. In this case, it is assumed that the API conversion DB 20 does not retain the API conversion program (Identity API v2→v3) 25 and the API conversion unit 140 cannot acquire the API conversion program (Identity API v2→v3) 25.

In step S509, the API conversion unit 140 extracts a difference (diff) between the API definition (Identity API v2) 22 and the API definition (Identity API v3) 23 and, when a new parameter is present in the new version number (v3), requests the service provision system 10 to give insufficient information.

In step S510, the API conversion unit 140 generates the API conversion program (Identity API v2→v3) 25 based on the insufficient information acquired from the service provision system 10 and the API definition (Identity API v2) 22 and the API definition (identity API v3) 23 acquired from the API conversion DB 20.

In step S511, the API conversion unit 140 converts the received API from v2 into v3 based on the generated API conversion program (Identity API v2→v3) 25.

In step S512, the API conversion DB access unit 150 registers the generated API conversion program (Identity API v2→v3) 25 in the API conversion DB 20 and ends the processing of this flow.

API Conversion Rule Generation Procedure

A specific example of API conversion rule generation is explained.

Extraction of a Difference Between New and Old API Definitions

First, the API conversion device 100 (see FIG. 1) performs extraction of a difference (diff) between new and old API definitions. The extraction of the difference (diff) between the new and old API definitions correspond to the automatic processing in Step 1 of the API conversion rule generation procedure shown in FIG. 4 referred to above. More specifically, the extraction of the difference (diff) between the new and old API definitions is the extraction of the difference (diff) of the API conversion unit 140 shown in FIG. 6 (step S119).

FIG. 9 is a diagram showing an example of the extraction of a difference between new and old API definitions of the API conversion device 100. FIG. 9 is a specific example of the extraction of the difference (diff) between the new and old API definitions in the automatic processing in Step 1 in FIG. 4 referred to above.

As shown in FIG. 1 referred to above, in the API conversion DB 20, the API definition (Identity API v1) 21, the API definition (Identity API v2) 22, the API definition (Identity API v3) 23, and the API conversion program (Identity API) 24 are stored.

Extraction of the difference (diff v2⇔v3) between the API definition (Identity API v2) 22 and the API definition (Identity API v3) 23 is explained as an example.

As shown in FIG. 9, the API definition (Identity API v2) 22 describes
API version number version: "2.0"
API name title: "Identity API"
URL /v2.0/tokens:
HTTP method post: and
following parameter definition parameters: and
the following parameter definition parameters:
further describes
parameter name—name: "methods"
a place of a parameter in: "body"
whether the parameter is an essential parameter required: true, and
a type of the parameter type: array, and describes
following response definition responses.

On the other hand, in the API definition (Identity API v2) 23, compared with the API definition (Identity API v3) 22, as indicated by [difference 1] of a sign "a" in FIG. 9, there is a URL change of URL/v3.0/tokens:.

As indicated by [difference 2] of a sign "b" in FIG. 9, a "domain" parameter is added and is a difference.

Parameter Addition

Subsequently, the API conversion device 100 inputs a parameter present in only one of the API definitions. Specifically, since a parameter "domain" is added in the API definition (Identity API v3), the API conversion device 100 has the maintenance operator 10a to input a value of the parameter.

This parameter addition corresponds to the manual processing in Step 2 of the API conversion rule generation procedure shown in FIG. 4 referred to above. More specifically, the parameter addition is the insufficient information request (step S19) and the insufficient information answer (step S20) that the API conversion unit 140 shown in FIG. 6 performs via the external system IF unit 110.

API Conversion Program Generation and Registration

Subsequently, the API conversion device 100 generates and registers an API conversion program. Specifically, the API conversion device 100 generates a character string conversion program for the [difference 1] (URL change: "/v2.0/tokens"→"/v3.0/tokens") and the [difference 2] ("domain" parameter addition) and registers the character string conversion program in the API conversion DB 20. The API conversion program generation and registration corresponds to the automatic processing in Step 3 of the API conversion rule generation procedure shown in FIG. 4 referred to above. More specifically, the API conversion program generation and registration is the processing (step S122) in which the API conversion unit 140 shown in FIG. 6 generates the API conversion program (Identity API v2→v3) based on the insufficient information becoming insufficient when the acquired API conversion program (Identity API v2→v3) is generated and the API definition (Identity API v2) 22 and the API definition (Identity API v3) 23, and the processing (step S22) in which the API conversion DB access unit 150 registers the generated API conversion program (Identity API v2→v3) in the API conversion DB 20.

API Conversion Example

An API conversion example is explained more in detail.

Figure 10:
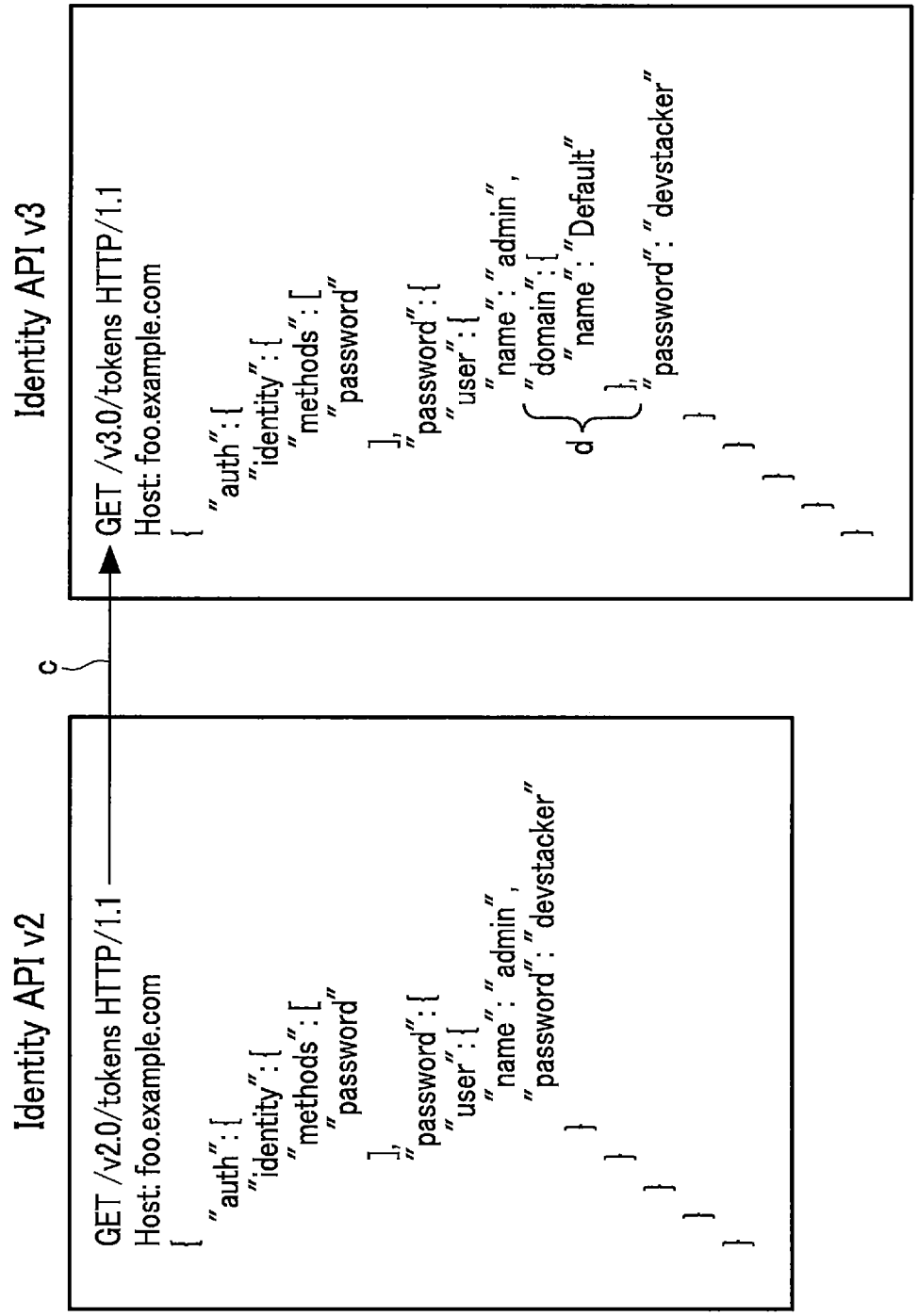
FIG. 10 is a diagram showing an API conversion example of the API conversion device according to the embodiment of the present invention.

FIG. 10 is a diagram showing an API conversion example of the API conversion device 100. The left in FIG. 10 is an access token of the Identity API v2 received by the external system IF unit 110 shown in FIG. 7 referred to above (step S31). The right in FIG. 10 is an access token of the Identity API v3 that the management target system IF unit 130 shown in FIG. 7 referred to above transmits to the management target system 30 (the OpenStack Newton version server 32) (step S35).

As indicated by the [conversion 1] of a sign "c" in FIG. 10, an access token "GET /v2.0/tokens HTTP/1.1" of the Identity API v2 is converted into an access token "GET /v3.0/tokens HTTP/1.1" of the Identity API v3.

As indicated by the [conversion 2] of a sign "d" in FIG. 10, a new parameter

```
"domain": {
"name": "Default"
},
``` is added to the access token of the Identity API v3.

Hardware Configuration

Figure 11:
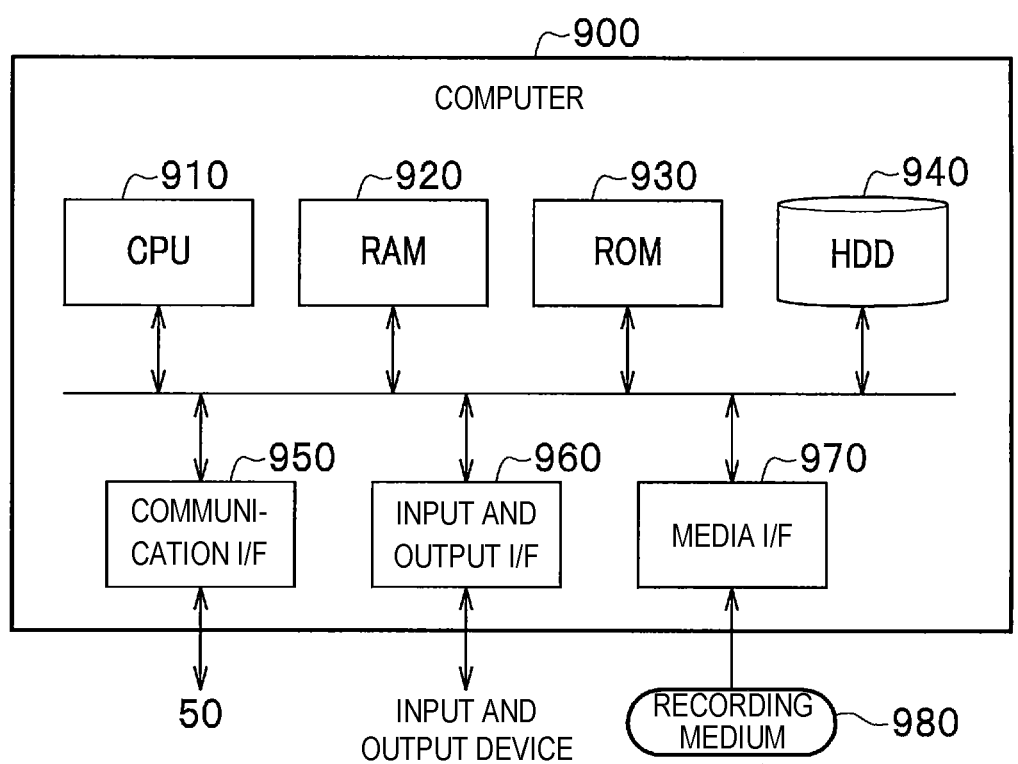
FIG. 11 is a hardware configuration diagram showing an example of a computer that realizes a function of the API conversion device according to the embodiment of the present invention.
Figure 12:
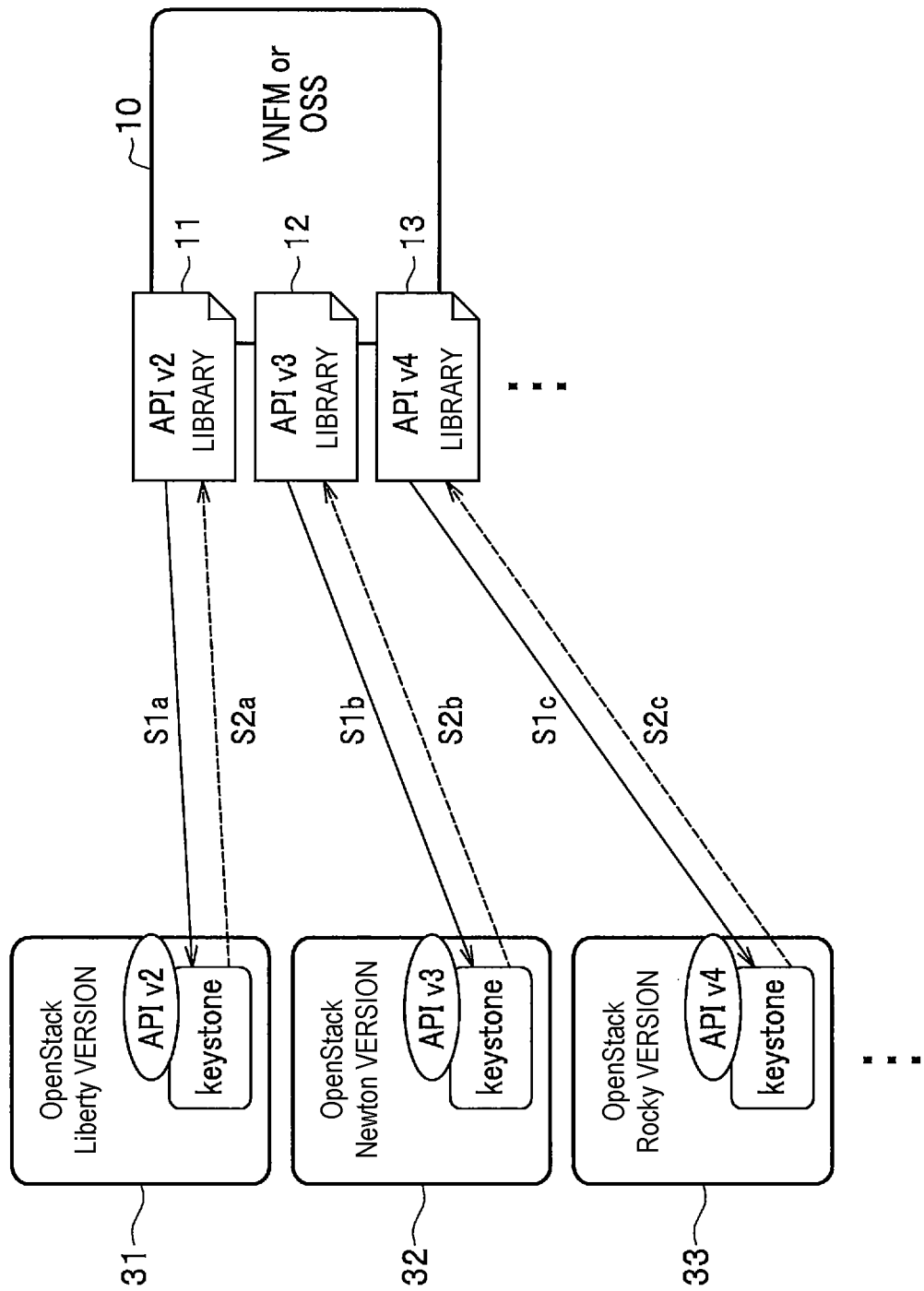
FIG. 12 is a schematic diagram of a network system in which a plurality of version numbers are mixed in a homogeneous API.

The API conversion device 100 according to the present embodiment is realized by, for example, a computer 1000 having a configuration shown in FIG. 11. The API conversion device 100 is explained as an example below. FIG. 11 is a hardware configuration diagram showing an example of a computer 900 that realizes the functions of the API conversion device 100.

The computer 900 includes a CPU 910, a RAM 920, a ROM 930, an HDD 940, a communication interface (I/F: Interface) 950, an input and output interface (I/F) 960, and a media interface (I/F) 970.

The CPU 900 operates based on a program stored in the ROM 930 or the HDD 940 and performs control of the units. The ROM 930 stores a boot program executed by the CPU 910 at a start time of the computer 900, a program relying on hardware of the computer 900, and the like.

The HDD 940 stores a program to be executed by the CPU 910 and data and the like used by such a program. The HDD 940 may be, for example, the API conversion DB 20 (see FIG. 1). The communication interface 950 receives data from other apparatuses via a communication network 50 and sends the data to the CPU 910 and transmits data generated by the CPU 910 to the other apparatuses via the communication network 50.

The CPU 910 controls, via the input and output interface 960, output devices such as a display and a printer and input devices such as a keyboard and a mouse. The CPU 910 acquires data from the input devices via the input and output interface 960. The CPU 910 outputs the generated data to the output devices via the input and output interface 960.

The media interface 970 reads programs or data stored in a recording medium 980 and provides the programs or the data to the CPU 910 via the RAM 920. The CPU 910 loads such programs from the recording medium 980 onto the RAM 920 via the media interface 970 and executes the loaded programs. The recording medium 980 is an optical recording medium such as a DVD (Digital Versatile Disc) or a PD (Phase change rewritable Disk), a magneto-optical recording medium such as an MO (Magneto Optical disk), a tape medium, a magnetic recording medium, a semiconductor memory, or the like.

For example, when the computer 900 functions as the API conversion device 100 according to the present embodiment, the CPU 910 of the computer 900 executes the programs loaded onto the RAM 920 to thereby realize the functions of the units of the API conversion device 100. Data in the units of the API conversion device 100 are stored in the HDD 940. The CPU 910 of the computer 900 reads these programs from the recording medium 980 and executes the programs. However, as another example, the CPU 910 may acquire these programs from another device via the communication network 50.

Effects

As explained above, the API conversion device 100 includes the API conversion DB 20, the API conversion DB access unit 150, the API-version-number management unit 120, and the API conversion unit 140 explained below. The API conversion DB 20 stores the API definitions 21 to 23, which are the definition documents describing the APIs provided by the service provision system 10, and the API conversion program 24 for the API conversion function. The API conversion DB access unit 150 accesses the API conversion DB 20. When the API-version-number management unit 120 does not retain a version number of an API of the management target system 30 including a plurality of control target servers 31 to 33 controllable using APIs, the API-version-number management unit 120 acquires a version number of the API from the management target system 30. When the version number of the API of the service provision system 10 and the version number of the API of the management target system 30 are different, the API-version-number management unit 120 instructs the API conversion unit 140 to perform API conversion. The API conversion unit 140 receives the API conversion instruction from the API-version-number management unit 120, acquires the API definitions 21 to 23 and the API conversion program 24 from the API conversion DB access unit 150, and converts the received API into a new version number.

When the API conversion program was not successfully acquired, the API conversion unit 140 extracts a difference between the acquired API definitions of the new and old versions. When a new parameter is present in the API definition of the new version number, the API conversion unit 140 requests the service provision system 10 to give insufficient information. The API conversion unit 140 generates the API conversion program 25 of the new version number based on the insufficient information acquired from the service provision system 10 and the API definitions 21 to 23 of the new and old version numbers acquired from the API conversion DB 20. The API conversion unit 140 converts the received API into the new version number based on the API definitions 21 to 23 and the API conversion program 25.

Consequently, the API conversion device 100 can conceal a difference of a version number of an API of the management target system at low cost and reduce management cost of the service provision system.

More specifically, the API conversion device 100 includes the API conversion DB access unit 150, the API-version-number management unit 120, and the API conversion unit 140 explained below. The API conversion DB access unit 150 accesses the API conversion DB 20 that stores the API definitions (Identity APIs v1) 21 to 23 and the API conversion program (Identity API) 24. The API-version-number management unit 120 confirms whether the API-version-number management unit 120 retains a version number of an API of the management target system and, when a version number of the API is not retained, acquires a version number of the API from the management target system and compares the version number (v2) of the API received from the service provision system and the version number (v3) of the API of the management target system. When the version numbers of both the APIs are different, the API-version-number management unit 120 instructs the API conversion unit 140 to perform API conversion. The API conversion unit 140 receives the API conversion instruction and acquires the API definitions (Identity APIs v2 and v3) and the API conversion program (Identity API v2→v3) from the API conversion DB 20. The API conversion unit 140 converts the received API from v2 to the new version number v3 based on the acquired API definitions (Identity APIs v2 and v3) and the API conversion program (Identity API v2→v3). When the API conversion program (Identity API v2→v3) 25 was not successfully acquired, the API conversion unit 140 extracts a difference (diff) between the API definition (Identity API v2) and the API definition (Identity API v3). When a new parameter is present in the new version number (v3), the API conversion unit 140 requests the service provision system to give insufficient information and generates the API conversion program (Identity API v2→v3) 25 based on the insufficient information acquired from the service provision system 10 and the API definition (Identity API v2) 22 and the API definition (Identity API v3) 23 acquired from the API conversion DB 20.

In this way, the API conversion device 100 classifies an API conversion process into processing capable of being automated and processing in which manpower should be interposed. That is, in the API conversion unit 140, the API conversion process is divided into a conversion rule generation and registration procedure and an API execution procedure (see FIG. 4). Accordingly, when a new parameter is present in the new version number (v3), the API conversion program (Identity API v2→v3) 25 can be generated using the insufficient information acquired from the service provision system 10. Consequently, there is an effect that it is possible to perform efficient and flexible API conversion. For example, even when a plurality of version numbers are mixed and a version of an API is different for each of the version numbers, it is possible to conceal a difference of a version number of an API. It is possible to reduce management cost of the service provision system 10 that uses a VNFM, an OSS, or the like.

In the API conversion device 100, the API conversion DB access unit 150 registers the generated API conversion program (Identity API v2→v3) 25 (an API conversion program of the new version number) in the API conversion DB 20.

Consequently, it is possible to reuse an API conversion program generated and registered by another person. It is possible to further reduce the management cost of the service provision system 10.

Others

Among the kinds of processing explained in the embodiment, all or a part of the processing explained as being automatically performed can be manually performed or all or a part of the processing explained as being manually performed can be automatically performed by a publicly-known method. Besides, the information including the processing procedures, the control procedures, the specific names, the various data and parameters described in this document and shown in the drawings can be optionally changed except when particularly noted otherwise.

The constituent elements of the devices shown in the figures are functionally conceptual and do not always need to be physically configured as shown in the figures. That is, a specific form of distribution and integration of the devices is not limited to the form shown in the figures. All or a part of the devices can be configured by being functionally or physically distributed and integrated in any unit according to various loads, a state of use, and the like.

A part or all of the components, the functions, the processing units, the processing means explained above may be realized by hardware by, for example, being designed as an integrated circuit. The components, the functions, and the like explained above may be realized by software for a processor to interpret and execute programs for realizing the respective functions. Information concerning programs, tables, files, and the like for realizing the functions can be retained in a recording device such as a memory, a hard disk, or an SSD (Solid State Drive) or a recording medium such as an IC (Integrated Circuit) card, an SD (Secure Digital) card, or an optical disk. In this specification, the processing steps describing time-series processing include not only processing that is performed in time series according to described order but also processing that is not always performed in time series but is executed in parallel or individually (for example, parallel processing or processing by an object).

REFERENCE SIGNS LIST

10 Service provision system
10a Maintenance operator
20 API conversion DB (storage unit, storage means)
21 to 23 API definition
24, 25 API conversion program
30 Management target system
31 to 33 Server (control target server)
110 External system IF unit
120 API-version-number management unit
130 Management target system IF unit
140 API conversion unit
150 API conversion DB access unit (access unit)

The invention claimed is:

1. An API conversion device comprising:
   an access unit, implemented using one or more processors, configured to access a storage unit that stores API definitions, which are definition documents describing APIs (Application Program Interfaces) provided by a service provision system, and an API conversion program for an API conversion function;
   an API-version-number management unit, implemented using the one or more processors, configured to acquire, when a version number of an API of a management target system including a plurality of control target servers controllable using the APIs is not retained, the version number of the API from the management target system and instruct API conversion when a version number of the API of the service provision system and the version number of the API of the management target system are different; and
   an API conversion unit, implemented using the one or more processors, configured to receive the API conversion instruction from the API-version-number management unit, acquire the API definitions and the API conversion program with the access unit, convert a received API into a new version number, when the API conversion program was not successfully acquired, extract a difference between the acquired API definitions of new and old version numbers, and, when a new parameter is present in the API definition of the new version number, request the service provision system to give insufficient information and generate an API conversion program of the new version number based on the insufficient information acquired from the service provision system and the API definitions of the new and old version numbers acquired from the storage unit, and convert the received API into the new version number based on the API definitions and the API conversion program.

2. The API conversion device according to claim 1, wherein the access unit is configured to register the generated API conversion program of the new version number in the storage unit.

3. An API conversion method executed by an API conversion device, the API conversion method comprising:
   accessing, by an access unit, a storage unit that stores API definitions, which are definition documents describing APIs (Application Program Interfaces) provided by a service provision system, and an API conversion program for an API conversion function;
   acquiring, by an API-version-number management unit, when a version number of an API of a management target system including a plurality of control target servers controllable using the APIs is not retained, the version number of the API from the management target system and instructs API conversion when a version number of the API of the service provision system and the version number of the API of the management target system are different; and receiving, by an API conversion unit, the API conversion instruction from the API-version-number management unit, acquires the API definitions and the API conversion program with the access unit, converts a received API into a new version number, when the API conversion program was not successfully acquired, extracts a difference between the acquired API definitions of new and old version numbers, and, when a new parameter is present in the API definition of the new version number, requests the service provision system to give insufficient information and generates an API conversion program of the new version number based on the insufficient information acquired from the service provision system and the API definitions of the new and old version numbers acquired from the storage unit, and converts the received API into the new version number based on the API definitions and the API conversion program.

4. A program stored in a recording medium and executable by a processor for causing a computer functioning as an API conversion device, which is provided between a service provision system that provides an API (Application Program Interface) service and a management target system including a plurality of control target servers controllable using APIs, to execute:

an access procedure for accessing storage means that stores API definitions, which are definition documents describing APIs provided by the service provision system, and an API conversion program for an API conversion function;

an API-version-number management procedure for acquiring, when a version number of an API of the management target system including the plurality of control target servers controllable using the APIs is not retained, the version number of the API from the management target system and instructing API conversion when a version number of the API of the service provision system and the version number of the API of the management target system are different; and an API conversion procedure for receiving the API conversion instruction by the API-version-number management procedure, acquiring the API definitions and the API conversion program with the access procedure, converting a received API into a new version number, when the API conversion program was not successfully acquired, extracting a difference between the acquired API definitions of new and old version numbers, and, when a new parameter is present in the API definition of the new version number, requesting the service provision system to give insufficient information and generating an API conversion program of the new version number based on the insufficient information acquired from the service provision system and the API definitions of the new and old version numbers acquired from the storage means, and converting the received API into the new version number based on the API definitions and the API conversion program.

* * * * *